United States Patent [19]
Herden

[11] Patent Number: 5,861,745
[45] Date of Patent: Jan. 19, 1999

[54] MEASURING DEVICE FOR CONTACTLESS DETERMINATION OF RELATIVE ANGULAR POSITION WITH AN IMPROVED LINEAR RANGE

[75] Inventor: Werner Herden, Gerlingen, Germany

[73] Assignee: Robert Bosch GmbH, Stuttgart, Germany

[21] Appl. No.: 703,950

[22] Filed: Aug. 28, 1996

[30] Foreign Application Priority Data

Sep. 29, 1995 [DE] Germany ........................ 195 36 322.1
Dec. 19, 1995 [DE] Germany ........................ 295 20 111 U

[51] Int. Cl.$^6$ ............................. G01B 7/14; G01B 7/30
[52] U.S. Cl. .................................. 324/207.2; 324/207.25
[58] Field of Search ........................... 324/207.2, 207.21, 324/207.25, 251, 173, 174, 175, 166, 117 H; 338/32 R, 32 H

[56] References Cited

U.S. PATENT DOCUMENTS

| | | | |
|---|---|---|---|
| 4,499,420 | 2/1985 | Shiraki et al. | 324/174 |
| 4,570,118 | 2/1986 | Tomczak et al. | 324/251 |
| 5,444,369 | 8/1995 | Luetzow | 324/207.25 |

FOREIGN PATENT DOCUMENTS

| | | |
|---|---|---|
| 2670286 | 5/1992 | France . |
| 2 670 286 | 6/1992 | France . |
| 3205080 | 9/1982 | Germany . |
| 3720086 | 1/1988 | Germany . |
| 9106064.8 | 10/1992 | Germany . |

*Primary Examiner*—Jay M. Patidar
*Attorney, Agent, or Firm*—Michael J. Striker

[57] ABSTRACT

A measuring device for contactless determination of relative angular position including a stator (10) provided with slot-like stator air gaps (14, 15), a rotor (12) rotatable relative to the stator with a main gap between it and the stator and a Hall element (16) arranged in at least one of the stator air gaps. Two ring magnets (21, 22) having magnetic polarities opposite to each other are provided in the interior wall of the stator (10). To measure a rotational angle of greater than ±75° with a linear response measurement curve, the first ring magnet (15) extends around the rotor (11) over an angular range of greater than 180°. When the null point of the magnetic induction B is shifted to the beginning of the linear range of the mechanical measuring range, particularly small rotation angles can be measured with a comparatively reduced measurement error.

12 Claims, 6 Drawing Sheets

MEASURING DEVICE FOR CONTACTLESS DETERMINATION OF RELATIVE ANGULAR POSITION WITH AN IMPROVED LINEAR RANGE

BACKGROUND OF THE INVENTION

The present invention relates to measuring devices for contactless determination of relative angular position.

A measuring device for contactless determination of relative movement between a rotor and a stator is known, in which a main gap is provided between the stator and the rotor, at least one stator air gap is provided in the stator, at least one magnetic field sensing element is provided in the at least one stator air gap and at least one ring magnet is arranged in the rotor with magnetic polarization aligned in the radial direction.

A measuring device of this type is described in French Published Patent Application FR-OS 90 15 223, in which a stator and rotor move relative to each other. A comparatively small air gap is found between the stator made from magnetically conductive material and the rotor. A first ring-shaped permanent magnet which is radially polarized is arranged in the rotor over an arc length of 180°. In addition, a second ring-shaped permanent magnet polarized magnetically in the opposite sense extends similarly over a 180° portion of the stator. Furthermore the stator has two stator air gaps arranged diametrically opposite to each other. A Hall sensor is arranged in at least one of these stator air gaps. The strength of the magnetic field passing through the Hall sensor changes on rotation of the rotor relative to the stator. This change of magnetic field produces a measurement signal proportional to the size of the rotational motion. The linear measurement range of this measuring device is however limited to a size of about ±75°. Furthermore with a measurement range of about 150° the rotor is arranged relative to the stator so that the null point of the induction is in the center of the angular range. Because of that, one obtains measurement signals with a minimum measurement error in the center of the measurement range and measurement signals with correspondingly larger measurement errors at the ends of the measurement range.

SUMMARY OF THE INVENTION

It is an object of the present invention to provide a measuring device for contactless measurement of rotational position and thus movement of the above-described type having a linear measurement range of greater than ±90°.

This object and others which will be made more apparent hereinafter is attained in a measuring device for contactless determination of relative angular position between a rotor and a stator, in which a main gap is provided between the stator and the rotor, at least one stator air gap is provided in the stator, at least one magnetic field sensing element is provided in the at least one stator air gap and at least one ring magnet is arranged in the rotor with magnetic polarization aligned in the radial direction.

According to the invention, one of the ring magnets must have an angular extent around the rotor of greater than 180°.

A prerequisite for linearity is also understandably that the magnetic field sensitive element has a largely linear dependence of its measurement signal on magnetic induction B. Because of the shift of the starting point of the angular range to the null point of the magnetic induction B, a comparatively high accuracy is possible in a comparatively small measured value range, which means in the vicinity of the initial point of the measurement, that is the angular null point, because at this point only the effect of temperature on the Hall sensor is active and in the modern concept of the Hall sensor this effect of temperature can be held to a minimum. This high measurement accuracy in this region is particularly necessary when the measuring device is used in a motor vehicle. When the measuring device is used for example for adjusting the position of the throttle valve or for observing the position of the accelerator, so that already with a nearly closed throttle valve and/or with a nearly idle position of the accelerator very small angular changes cause a correspondingly large flow of fuel. In contrast comparatively larger measurement errors are tolerable in this application in the region of very large rotational angle. The making of the ring magnets or their individual sections is essentially simplified, when the permanently magnetic material is combined with plastic. Because of that ring magnets having a predetermined geometry can be made economically with a high degree of precision by a plastic injection molding process. In comparison to the sintering process necessary for purely metal magnets after-working, which means e.g. grinding, can be avoided. In the plastic injection molding process a ring magnet or an individual segment of it may be directly molded to the soft iron parts, both the rotor and also the stator.

Further features of the measuring device of the invention are described and claimed in greater detail in the appended dependent claims.

BRIEF DESCRIPTION OF THE DRAWING

The objects, features and advantages of the invention are described in more detail in the following detailed description reference being made to the accompanying drawing in which.

DESCRIPTION OF THE PREFERRED EMBODIMENTS

Figure 1:
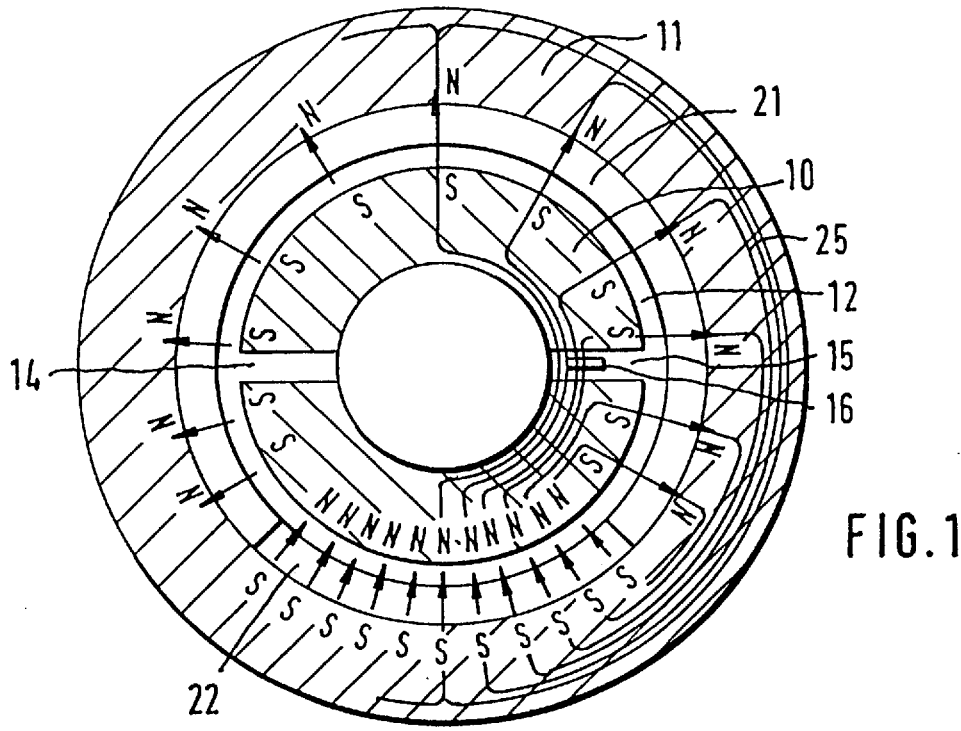
FIG. 1 is a longitudinal cross-sectional view through a first embodiment of the measuring device of the invention having two ring magnets.

A stator 10 which is embraced or surrounded by a rotor 11 is shown in FIG. 1. A main gap 12, which should be as small as possible, is provided between the stator 10 and the rotor 11 and in practice amounts to about 0.5 mm. The stator 10 and the rotor 11 are made of a magnetically conductive material with a higher permeability and a reduced magnetic hysteresis. This material can be, for example, soft iron. The stator 10 is provided with two diametrically opposing stator air gaps 14,15. At least in stator air gap 15 at least one Hall element 16 is located, with which the relative motion of the rotor 11 relative to the stator 10 is measured. Instead of a Hall element also any magnetic field sensitive component, such as a field plate, magnetic transistor, magnetoresistive element, etc, can be used. However it is important that the output signal of the magnetic field sensing component have as linear a dependence on the magnetic induction B as possible. The stator 10 can understandably also be formed with only one stator air gap 15. The second stator air gap 14 is only necessary when a redundant or measurement error compensating measurement should be performed with the help of a second magnetic field sensitive component.

In order to be able to produce a measurement signal with the help of the Hall element 16, a first ring magnet 21 and a second ring magnet 22 may be mounted on the inner wall of the rotor 11 facing the stator 10. The first ring magnet 21 forms an angular arc segment of about 240°, while the second ring magnet 22 form an angular arc segment of 120° so that both ring magnets 21, 22 form a closed circuit. It is important that the first ring magnet 21 extend over an angular arc segment of greater than 180° and a second ring magnet 22 extends over the remaining angular arc segment of completing a 360° arc. The magnetic polarization of both ring magnets 21, 22 is aligned radially and opposite to each other, which means, that for example with the first ring magnet 21, as shown in FIG. 1, the magnetic North pole is located on the inner wall of the rotor 11, while in the second ring magnet 22 the magnetic South pole is located on the inner wall of the rotor 11. Conventional commercial permanent magnets can be used as the ring magnets 21, 22. Also the ring magnets can be suitably magnetized prior to their installation. However it is advantageous when the permanent magnet and/or the magnetic material is built into the plastic material. The magnetic material can be made in an injection molding process. Because of that a comparatively high precision and an economical manufacture of the ring magnets 21, 22 was possible. The ring magnets can be injection molded directly in the cavities in the rotor. For example, $SmCo_5$, $Sm_2CO_{17}$, NdFeB, AlNiCo or Ferite are used as magnetic materials.

A magnetic flux 25 is formed in the rotor 11 and the stator 10 because of the ring magnets 21, 22. The field lines of this magnetic flux 25 extend from the magnetic North pole of the first ring magnet 21 through the rotor 11 to the South pole of the second ring magnet 22 and/or from the North pole of the second ring magnet 22 through the air gap 12 to the South pole of the first ring magnet 21. The path of the magnetic flux 25 also goes through the Hall element 16 arranged in the stator air gap 15. Should the rotor 11 move relative to the stator 10, the magnetic flux 25 increases or decreases through the Hall element 16 according to the rotation direction. This change of strength for the magnetic flux 25 is linearly dependent on the rotation angle of the rotor 11 relative to the stator 10, since a constant flux increase (Induction B) and/or a constant flux decrease per angular unit occurs because of the homogeneous radial magnetization of both ring magnets 21, 22. In a known way the magnetic induction B produces an electrical output signal in the Hall element 16, which changes linearly with the rotation angle. Understandably it would also be possible to exchange the rotor with the stator in the embodiment shown in FIG. 1.

Figure 2:
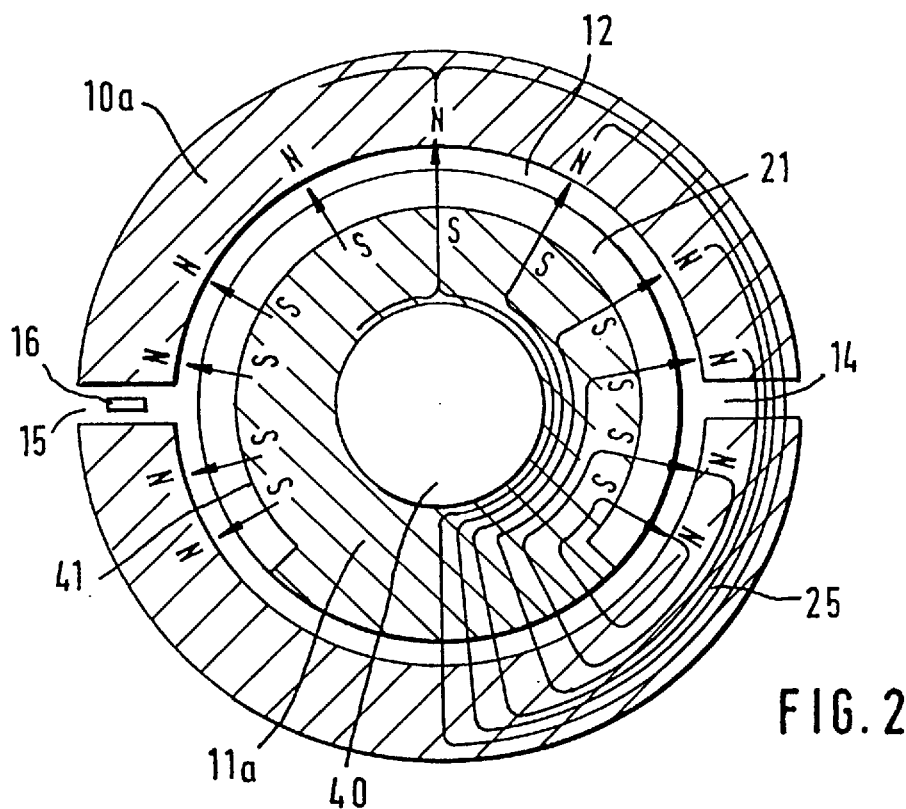
FIG. 2 is a longitudinal cross-sectional view through a second embodiment of the measuring device of the invention provided with only one ring magnet.

In the embodiment of FIG. 2 the rotor 11a is arranged in the interior of the stator 10a. The stator 10a is formed as a ring and has both slot-like air gaps 14, 15. The rotor 11a is connected with a shaft 40 whose rotational motion is to be measured and projects into the interior of the stator 10a, in which a small air gap 12 is found again between the rotor 11a and stator 10a. In contrast to the embodiment shown in FIG. 1 only one ring magnet 21 is present. The second ring magnet 22 is in the embodiment shown in FIG. 1 has been omitted here. Instead of this, the region between the ends of the ring magnet 21 is filled with magnetically conductive material. The ring magnet 21 is thus inserted in a cavity 41 provided in the outer wall of the stator 11a. The operation of this embodiment corresponds to that of the measuring device of FIG. 1. During the rotational motion of the rotor relative to the stator the magnetic induction B changes in the vicinity of the Hall element 16 and thus produces a measurement signal. The magnetic flux 25 extends from the North pole of the ring magnet 21 over the main gap 12, through the stator 10a, back across the main gap 12 and into the rotor 11a to the South pole of the ring magnet 21.

Figure 3:
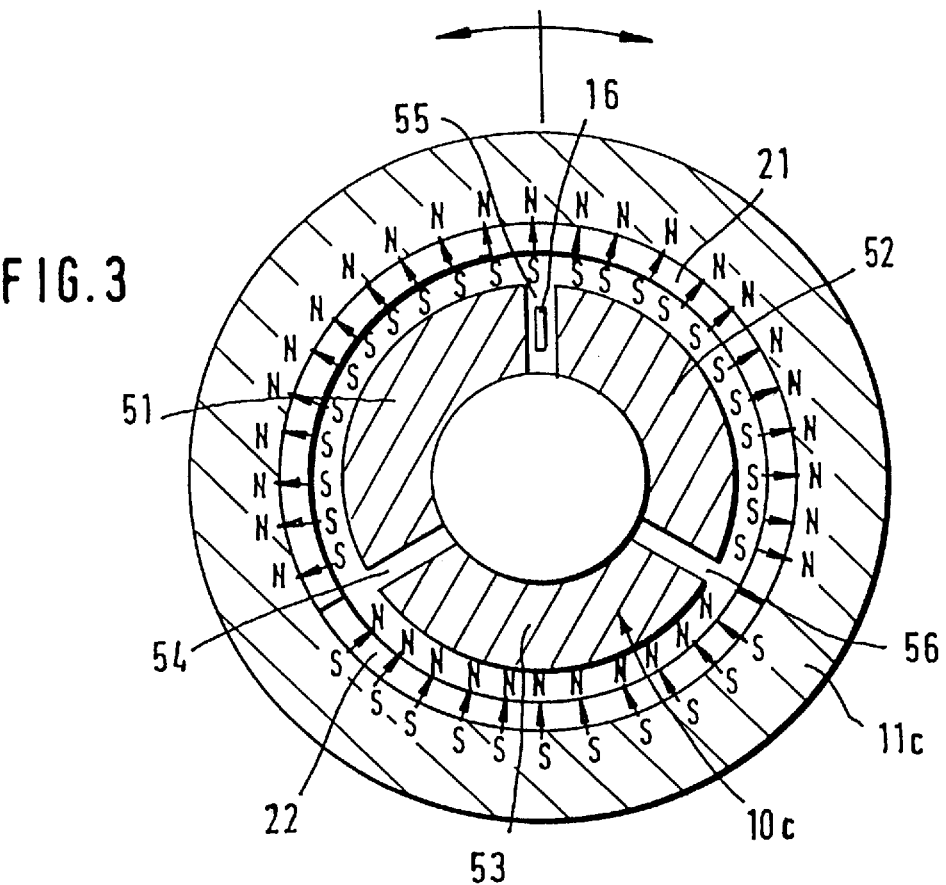
FIG. 3 to 9 are longitudinal cross-sectional views similar to FIGS. 1 and 2 of additional embodiments of the measuring device of the invention.

Additional embodiments with various changes are shown in FIGS. 3 to 8. Essentially in this embodiment none of the air gaps between the stator segments sweep over discontinuities in the rotor magnets, i.e. transitions from one magnet to another where a polarity reversal occurs and/or from a magnet to a region of magnetically conductive material. The linear course of the measurement curve can be improved by this feature over the entire measurement range and above all has an approximately linear behavior in the range from 90° to 110°. In FIG. 3 an embodiment with a stator 10c divided into three segments 51, 52 and 53 is shown. Each of the three segments 51, 52 and 53 extend around the rotor over an arc of about 120° and the stator air gaps 54, 55 and 56 are provided between pairs of the individual segments 51, 52 and 53. The rotor 11c corresponds to the structure shown in FIG. 1. If the stator 10c and the rotor 11c are in their starting position, the stator air gap 55 in which the Hall sensor 16 is arranged is located in the center of the ring magnet 21 having an angular extent of about a 240°. Both stator air gaps 54, 56 are formed in a transitional region of the ring magnet 21 to the ring magnet 22 because of a spacing from the stator air gap 55 of about 120°. Because of that neither the stator air gap 54 nor the stator air gap 56 sweeps over any discontinuities, i.e. transitional positions, from one ring magnet to another during a rotational motion of 120° in a clockwise or counterclockwise direction, also during the measurement process.

Figure 4:
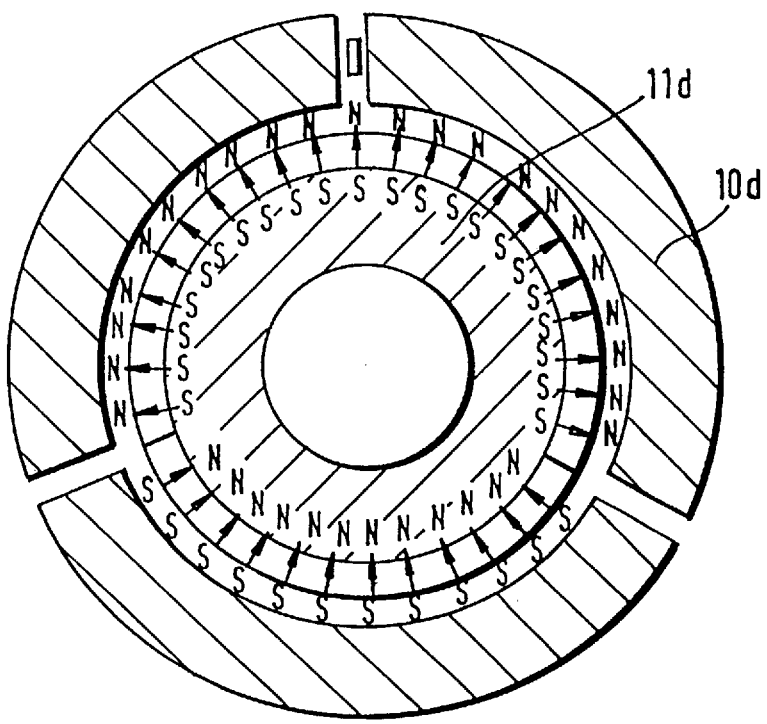

While in the embodiment of FIG. 3 the rotor 11c embraces the stator 10c, in FIG. 4 the rotor and the stator are exchanged, which means that in the embodiment of FIG. 4 the stator 10d embraces or surrounds the rotor 11d.

Figure 5:
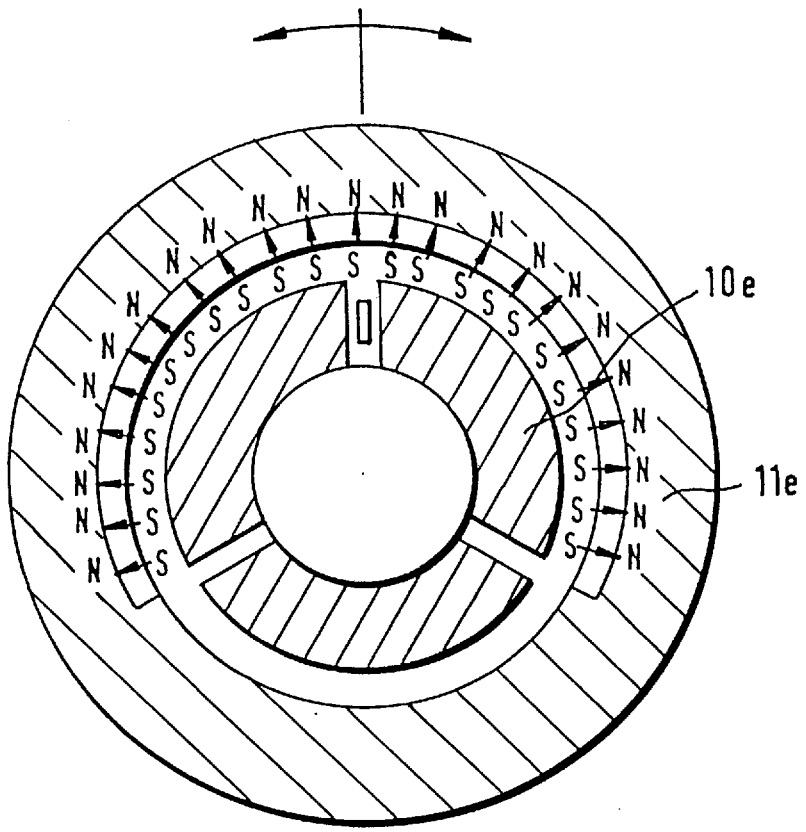
Figure 6:
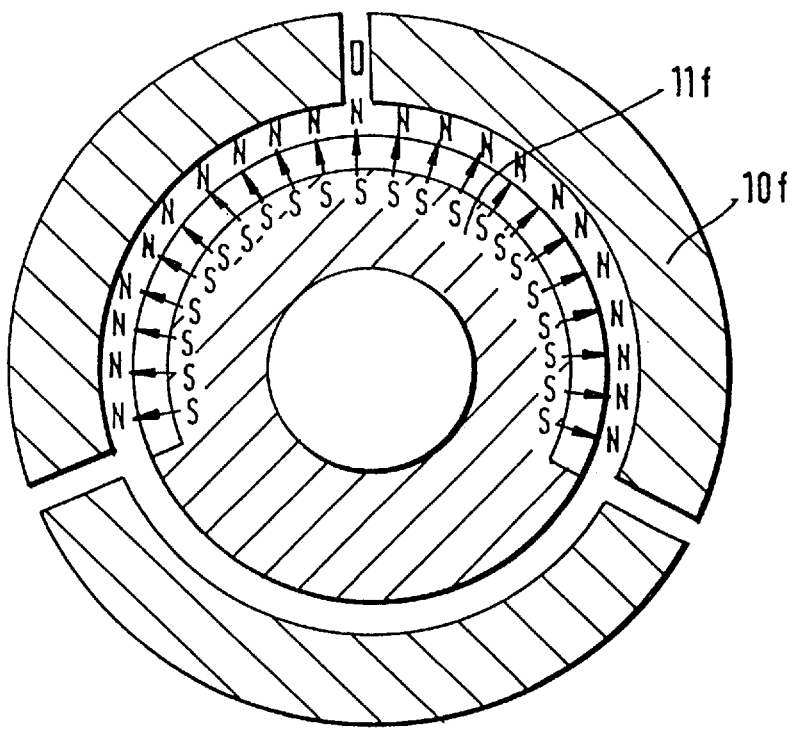
Figure 7:
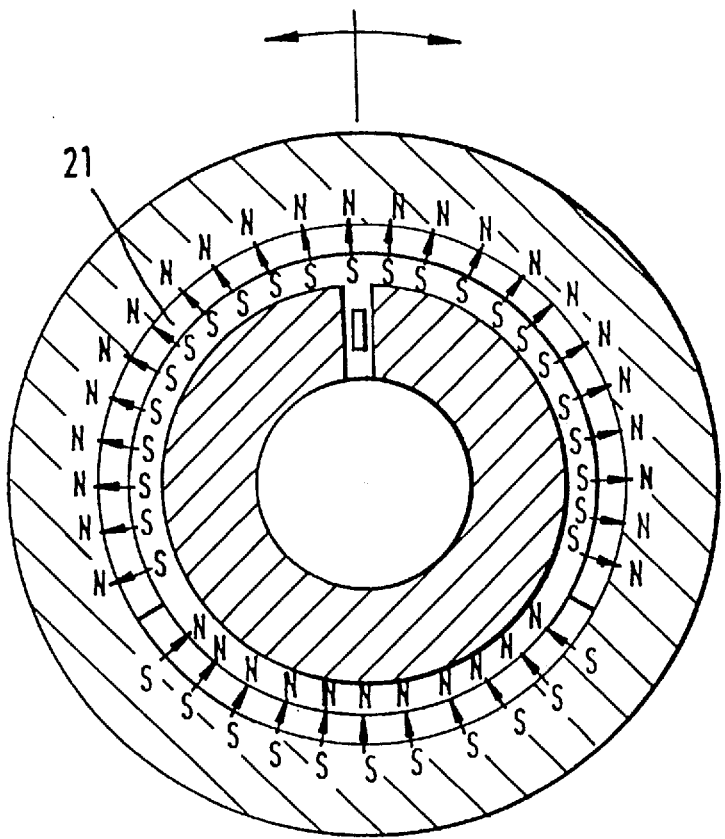

In the embodiment according to FIG. 5 the second ring magnet 22 is replaced by a region of magnetically conductive material. The structure of the stator 103, especially the section and the air gap, corresponds to that according to FIG. 3. In an analogous manner, in the same manner as from FIG. 3 to FIG. 4, the embodiment of FIG. 6 is the reverse of FIG. 5. In FIG. 6 an embodiment is shown in which the stator 10f surrounds or embraces the rotor 11f, but is otherwise the same.

If one operates with only a single Hall element, thus only one air gap can be formed in the stator. Because of that all measurement curve errors resulting from additional air gaps can be avoided. The starting point of the measurement is selectable further in the region of the angular range of the ring magnet 21 encompasssing about 270°, in which for a low temperature effect in the Hall sensor advantageously the null point of the angular range coincides with the null point of the magnetic induction, as illustrated in FIG. 10.

Figure 8:
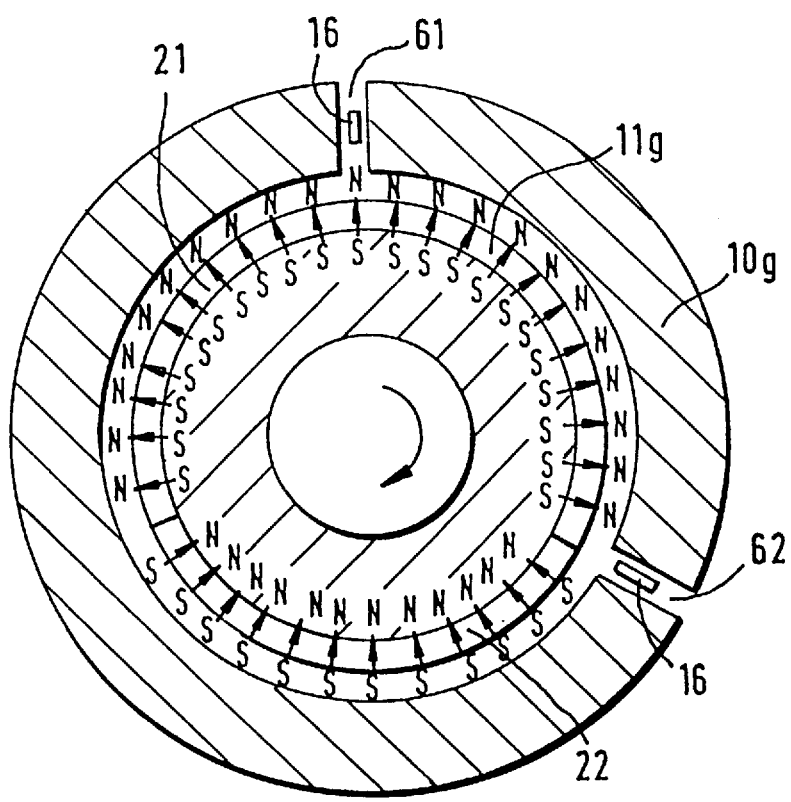

In the embodiment shown in FIG. 8 the stator 10g embraces or surrounds the rotor 11g. Furthermore the stator 10g has two stator air gaps 61, 62, in which the spacing between the stator air gaps 61, 62 amounts to 120°. In the starting position the first stator air gap 61 is arranged in the center of the ring magnet 21, while the second stator air gap 62 is located in a transitional region between both magnets 21, 22. In FIG. 8, e.g., a Hall element 16 is arranged in both stator air gaps 61, 62 in order to be able to perform the above-mentioned redundant or measuring error compensating measurement. Hereby the induction B increases continuously in the Hall element 16 in the stator air gap 61, while the induction B simultaneously decreases at the Hall element 16 in the stator air gap 62. The measured values were evaluated in a known electrical circuit device which has not been illustrated here.

Figure 9:
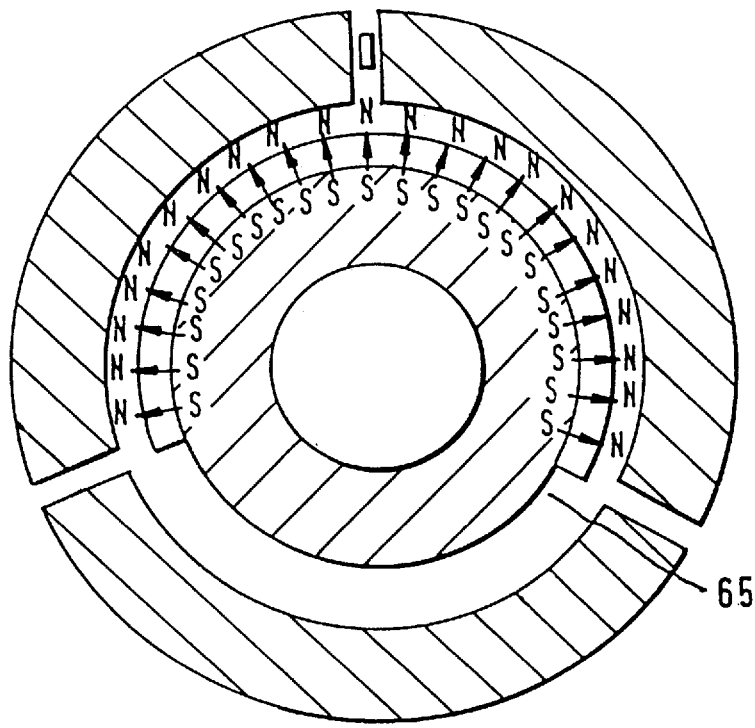

Furthermore in the embodiments shown in FIGS. 1, 3, 4, 7, and 8 the ring magnet 22 and/or the ring magnet 21 could be replaced by air or an air cavity, so that, as in FIG. 9, a wider stator air gap 65 would result in these regions.

Figure 10:
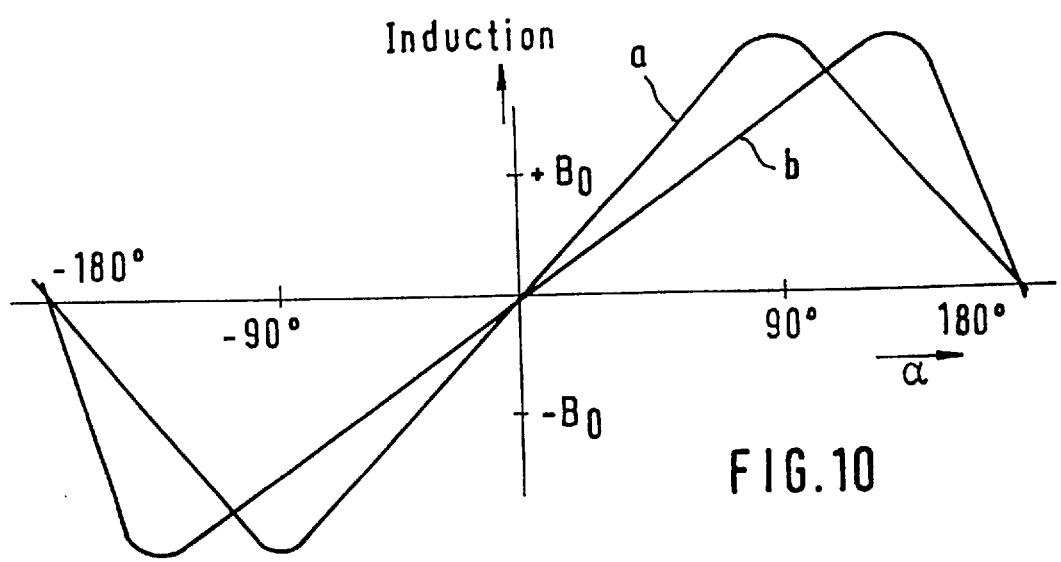
FIG. 10 is a graphical illustration of the dependence of the magnetic signal on angle.

In FIG. 10 curve a shows the variation of magnetic induction B with rotation angle a in a prior art measuring device. The linear region of the characteristic line amounts to about ±75°. So that measurements are linear in a measurement range of 100°, this can best occur from −25° to 75°. Because of that, the region of highest accuracy occurs in the center of the measurement range, namely at B=0.

In contrast in a device according to the invention, a linear range of the characteristic line greater than 90° results. Curve b shows a variation of magnetic induction B with rotation angle a in a measuring device according to the invention of about ±110°. Because of that according to the invention the possibility results in a desired linear measuring range of 110° to put the region with the highest measurement accuracy, namely with B=0, in the angular null point and thus to achieve the desired high accuracy at the angular null point.

Figure 11:
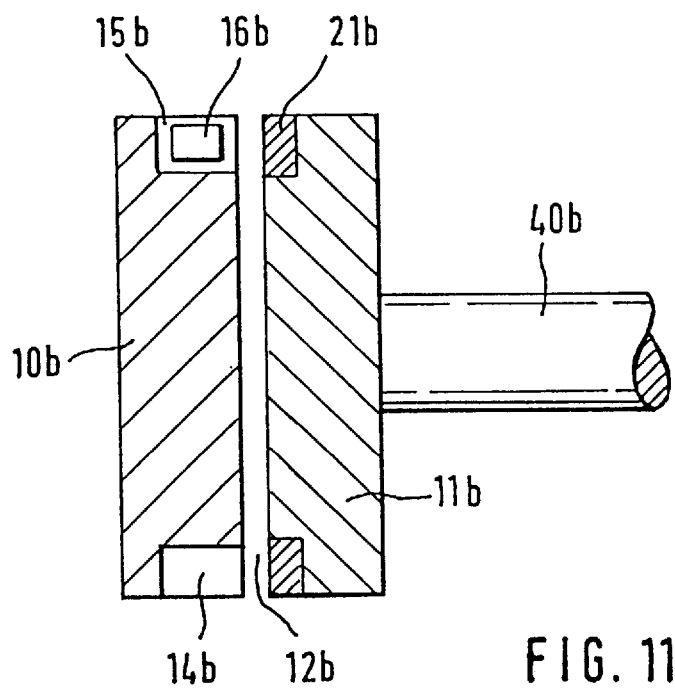
FIG. 11 is a side cross-sectional view through an embodiment of the measuring device according to the invention in which the rotor is spaced axially from the stator.

Instead of the stator and the rotor being arranged over each other as they are in the embodiments shown in FIGS. 1 to 9 the stator and the rotor can also be formed as disks axially spaced from each other and beside each other. A disk-like rotor 11b is attached to a shaft 40b in this type of arrangement which is shown in FIG. 11. Because of the cross-section only the ring magnet 21b is shown in FIG. 11. A stator air gap 12b is provided between the rotor 11b and the stator 10b. The slots 14b and 15b are present in the stator 10b, whereby a Hall element 16b for signal generation is located in the slot 15b. The embodiment of FIG. 11 corresponds to the structure according to FIG. 1. The embodiment according to FIGS. 2 to 9 could be reformed or revised accordingly.

While the invention has been illustrated and embodied in a measuring device for contactless determination of relative movement, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed is new and desired to be protected by letters patent is set forth in the appended claims:

I claim:

1. A measuring device for contactless determination of relative angular position, comprising a stator (10) provided with at least one stator air gap (14, 15, 54, 55, 56); a rotor (11) movable relative to the stator (10) with a main gap (12) between the rotor (11) and the stator (10); at least one magnetic field sensing element (16) located in the at least one stator air gap (14, 15, 54, 55, 56); and at least one ring magnet (21, 22) arranged in the rotor (11) and having a magnetic polarization aligned in a radial direction relative to the rotor (11), wherein one (21) of said at least one ring magnets extends around the rotor over an angular range of greater than 180°, wherein the rotor (11) encircles the stator (10) or the stator (10) embraces the rotor (11).

2. The measuring device as defined in claim 1, further comprising a magnetically conductive material extending in the rotor (11) between opposite ends of said one (21) of said at least one ring magnets which extends around the rotor over the angular range of greater than 180° and wherein said magnetically conductive material extends around the rotor (11) over a remaining angular range outside of said angular range.

3. The measuring device as defined in claim 1, wherein said at least one ring magnet (21, 22) consists of said one ring magnet (21) and another ring magnet (22), said another ring magnet (22) having a magnetic polarization opposite to said magnetic polarization of said one ring magnet and extending around said rotor between opposite ends of said one ring magnet (21).

4. The measuring device as defined in claim 1, wherein said stator (10) comprises a plurality of stator segments (51, 52, 53), said stator segments being separated from each other by said at least one stator air gap (14, 15, 54, 55, 56).

5. The measuring device as defined in claim 1, wherein the stator (10) is provided with three (54, 55, 56) stator air gaps (54, 55, 56) spaced 120° from each other.

6. The measuring device as defined in claim 1, wherein said at least one stator air gap consists of one (61) of said stator air gaps and another (62) of said stator air gaps spaced 120° therein.

7. The measuring device as defined in claim 1, wherein the stator (10) is provided with only one (61) of said at least one stator air gap and said one (61) of said at least one stator air gap is located in a center of said angular range over which said one (21) of said at least one ring magnet extends in a starting position at a beginning of operation of the measuring device.

8. The measuring device as defined in claim 1, wherein the stator (10) and the rotor (11) are each disk-shaped and spaced from each other axially.

9. The measuring device as defined in claim 1, wherein the stator (10) and the rotor (11) are each made from a magnetically conductive material.

10. The measuring device as defined in claim 1, wherein a null point of a mechanical measurement range is at least approximately coincident with a null point of a magnetic induction B.

11. The measuring device as defined in claim 1, wherein said at least one magnetic field sensing element (16) consists of a Hall element.

12. The measuring device as defined in claim 1, wherein a cavity is provided in the rotor (11) between opposite ends of said one (21) of said at least one ring magnet and said cavity extends over a remaining angular range outside of said angular range of greater than 180°.

* * * * *